(12) United States Patent
Hori

(10) Patent No.: US 8,061,202 B2
(45) Date of Patent: Nov. 22, 2011

(54) ANGULAR VELOCITY SENSOR ELEMENT

(75) Inventor: Tatsumaro Hori, Tokyo (JP)

(73) Assignee: TDK Corporation, Tokyo (JP)

( * ) Notice: Subject to any disclaimer, the term of this patent is extended or adjusted under 35 U.S.C. 154(b) by 508 days.

(21) Appl. No.: 12/379,236

(22) Filed: Feb. 17, 2009

(65) Prior Publication Data

US 2009/0241663 A1    Oct. 1, 2009

(30) Foreign Application Priority Data

Mar. 31, 2008    (JP) ................................ 2008-092328

(51) Int. Cl.
*G01C 19/56*    (2006.01)
(52) U.S. Cl. .................................. 73/504.16; 73/504.15
(58) Field of Classification Search ............... 73/504.12, 73/504.15, 504.16
See application file for complete search history.

(56) References Cited

U.S. PATENT DOCUMENTS

| | | | |
|---|---|---|---|
| 5,952,572 | A | 9/1999 | Yamashita et al. |
| 7,805,995 | B2 * | 10/2010 | Oguri et al. ................. 73/504.16 |
| 2001/0008087 | A1 | 7/2001 | Mochida |

FOREIGN PATENT DOCUMENTS

| | | |
|---|---|---|
| JP | A-9-196682 | 7/1997 |
| JP | A-10-89968 | 4/1998 |
| JP | A-11-14374 | 1/1999 |
| JP | A-11-72334 | 3/1999 |
| JP | A-2001-50751 | 2/2001 |
| JP | A-2001-194157 | 7/2001 |
| JP | A-2002-213963 | 7/2002 |
| JP | A-2006-162314 | 6/2006 |
| WO | WO 99/19689 | 4/1999 |

\* cited by examiner

*Primary Examiner* — John Chapman, Jr.
(74) *Attorney, Agent, or Firm* — Oliff & Berridge, PLC

(57) ABSTRACT

There is provided an angular velocity sensor element which, even when a sudden vibration is given from the outside, can absorb the vibration to prevent the vibration from being transmitted to an element section thereof. An angular velocity sensor element 1 according to the present embodiment includes: sensor units 10a to 10c with driven-related and detection-related vibrating arms; a base section 4 which couples the sensor units 10a to 10c; a first fixed section 6 which is frame-shaped and which surrounds the base section 4 and the sensor units 10a to 10c; first coupling arms 5a to 5c which couple the base section 4 to the first fixed section 6; a second fixed section 8 which is disposed in at least a part of the area around the first fixed section 6; and second coupling arms 7a to 7c which couple the first fixed section 6 to the second fixed section 8.

6 Claims, 8 Drawing Sheets

ANGULAR VELOCITY SENSOR ELEMENT

BACKGROUND OF THE INVENTION

1. Field of the Invention

The present invention relates to an angular velocity sensor element that detects an angular velocity of an object.

2. Description of the Related Art

Angular velocity sensor element's have hitherto been used for a technique of autonomously controlling the posture of ship, airplane, rocket or the like. Recently, they are also mounted in small-sized electronic apparatuses such as car navigation systems, digital cameras, video camcorders and mobile telephones. Consequently, there are demands for further miniaturization and thickness reduction of the angular velocity sensor elements.

However, vibrating arms of vibration-type angular velocity sensor are usually manufactured by means of cutting and forming performed by piezoelectric material machining. And since the machining accuracy is limited, it is difficult to meet the above demands for further miniaturization and thickness reduction.

Thus a technique has been proposed which, in order to achieve further miniaturization and thickness reduction of an angular velocity sensor element, performs a fine processing on a single crystal thin plate to form a vibrating arm. For example, in FIG. 21 of Japanese Patent Laid-Open No. 11-72334, an angular velocity sensor element has been disclosed which includes an element section with a vibrating arm and a frame-shaped fixed section secured to the element.

However, when a sudden shock is given from the outside to such angular velocity sensor element, a vibration caused by this shock is transmitted from the fixed section to the element section and detected as noise by the detection-related vibrating arm of the element section.

Thus, to address the above problem, the present invention has been devised, and an object thereof is to provide an angular velocity sensor element which, even when a sudden vibration is given from the outside, can absorb the vibration to prevent the vibration from being transmitted to an element section thereof.

SUMMARY OF THE INVENTION

To achieve the above object, an angular velocity sensor element according to the present invention includes: an element section with drive-related and detection-related vibrating arms; a first fixed section which is frame-shaped and which surrounds the element section; a first coupling arm which couples the element section to the first fixed section; a second fixed section which is disposed in at least a part of the area around the first fixed section; and a second coupling arm which couples the first fixed section to the second fixed section.

With this structure, when a shock is given from the outside, the clamped-clamped beam shaped second coupling arm functions as a shock absorber, so a vibration caused by this shock is reduced or filtered. More specifically, of the vibration given from the outside, only a vibration component corresponding to the vibration frequency of the second coupling arm is transmitted via the clamped-clamped beam vibration to the first fixed section. Consequently, only a small portion of the vibration from the outside is transmitted to the element section. Here, when the vibration frequency of the second coupling arm is different from that of the first coupling section, the vibration transmitted via the second coupling arm to the first fixed section is prevented from causing a vibration of the first fixed section, thus preventing the vibration from being transmitted to the element section and detected as noise.

Preferably, the position of coupling the first coupling arm to the first fixed section is different from the position of coupling the second coupling arm to the first fixed section. As a result, the vibration direction of the first coupling arm is different from the vibration direction of the second coupling arm. Thus the vibration of the second coupling arm caused by the absorption of external vibration is suppressed from causing a vibration of the first coupling arm.

For example, the element section is secured via three said first coupling arms to the first fixed section, and the first fixed section is secured via three said second coupling arms to the second fixed section. As a result, the element section is supported by the first fixed section at three points, and the first fixed section is supported by the second fixed section at three points. The one-point or two-point support is lower in stability than the three-point support; and the four or more-point support is lower in external vibration removing effect than the three-point support. Thus, when the support stability and vibration removing effect are both considered, the three-point support is preferably used.

For example, the element section includes: a base section coupled to the first coupling arm; and drive-related and detection-related vibrating arms which is disposed in a region defined by the base section, the first fixed section and the first coupling arm and which is coupled to the base section. Further, for example, the vibrating arm includes: a detection arm coupled to the base section; and two drive arms, disposed in two sides of the detection arm, and coupled to the base section.

For example, on the second coupling arm, there is formed a piezoelectric element that detects deformation of the second coupling arm. Accordingly, when it is assumed that the structure in the inner side of the second coupling arm, that is, the element section, first coupling arm and first fixed section constitute a weight (transducer), an acceleration applied to the transducer can be detected by detecting deformation of the second coupling arm. Thus the angular velocity sensor element can double as an acceleration sensor.

According to the present invention, even when a sudden vibration is given from the outside, the vibration can be reduced or absorbed, thus preventing the vibration from being transmitted to the element section.

DETAILED DESCRIPTION OF THE PREFERRED EMBODIMENTS

Figure 1:
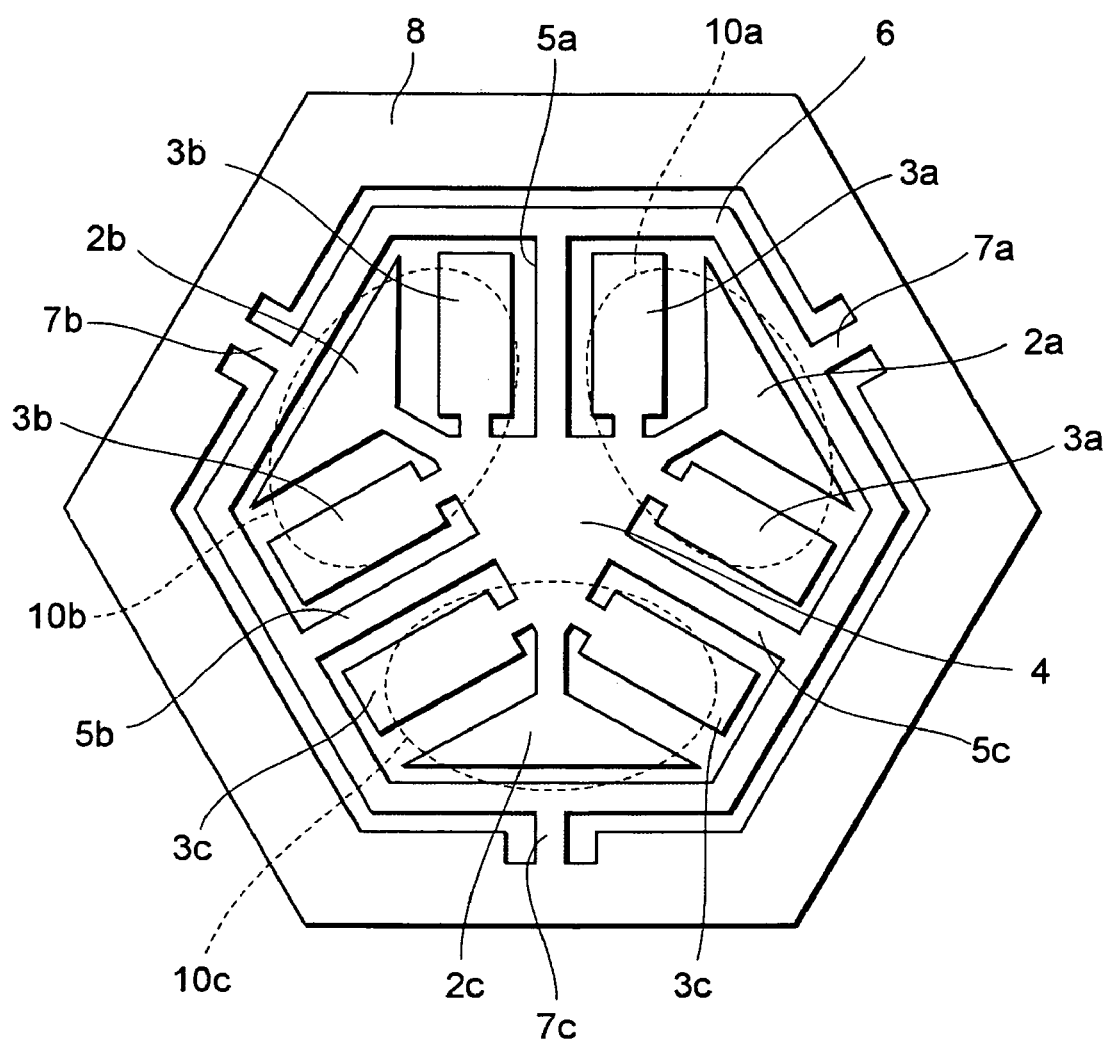
FIG. 1 is a plan view illustrating an example of an angular velocity sensor element 1 according to the present embodiment.

Embodiments of the present invention will be described below with reference to the drawings. In the drawings, the same numerical reference are applied to identical elements, and repeated explanation thereof is omitted. The positional relationship in the up/down/left/right directions is, except if otherwise mentioned, based on the positional relationship illustrated in the drawings. The dimension ratio in the drawings are not limited thereto. The following embodiments are merely exemplary of the present invention, and are not construed to limit the scope of the present invention. Further, many modifications to the embodiments are possible without departing from the gist of the invention.

First Embodiment

FIG. 1 is a plan view illustrating an example of an angular velocity sensor element 1 according to the present embodiment. The angular velocity sensor element 1 includes: an element section constituted of three sensor units 10a to 10c and a base section 4; a frame-shaped first fixed section 6 which surrounds the element section and which is coupled via first coupling arms 5a to 5c to the element section; a frame-shaped second fixed section 8 which is coupled via second coupling arms 7a to 7c to the first fixed section 6.

The base section 4 is disposed at the center of the angular velocity sensor element 1 and constituted of an equilateral triangle-shaped member. The sensor units 10a to 10c are arranged in respective corners of the equilateral triangle of the base section 4. The sensor unit 10a includes a detection arm 2a and two drive arms 3a and 3a disposed in two sides of the detection arm 2a. The sensor unit 10b includes a detection arm 2b and two drive arms 3b and 3b disposed in two sides of the detection arm 2b. The sensor unit 10c includes a detection arm 2c and two drive arms 3c and 3c disposed in two sides of the detection arm 2c.

The detection arms 2a to 2c are coupled to the respective corners of the base section 4. Accordingly, the detection arms 2a, 2b and 2c extend in a direction distant 120° from each other. The detection arms 2a to 2c are each formed to have a wide tip end, and this wide portion functions as a weight. The resonant frequency of the detection arms 2a to 2c is adjusted by the length of the detection arms 2a to 2c and the weight thereof.

The drive arms 3a to 3c are each coupled to the base section 4, and extend parallel to an adjacent arm of the first coupling arms 5a to 5c. The drive arms 3a to 3c are each formed to have a wide tip end, and this wide portion functions as a weight. The resonant frequency of the drive arms 3a to 3c is adjusted by the length and width of the drive arms 3a to 3c and the weight thereof.

For the first coupling arms 5a to 5c, one end thereof is coupled to the base section 4, and the other end thereof is coupled to the first fixed section 6. More specifically, the first coupling arms 5a to 5c are each coupled to the center of one side of the equilateral triangle of the base section 4. Thus the first coupling arms 5a to 5c extend in a direction distant 120° from each other. The resonant frequency of the first coupling arms 5a to 5c is adjusted by the length and width of the first coupling arms 5a to 5c.

The first fixed section 6 is constituted of a frame which surrounds the three sensor units 10a to 10c, for example, constituted of an equilateral hexagon-shaped frame. Of the equilateral hexagon-shaped frame of the first fixed section 6, the first coupling arms 5a to 5c are coupled to the center of the three sides which don't adjoin each other. Further, the second coupling arms 7a to 7c are coupled to the center of the other three sides to which the first coupling arms 5a to 5c are not coupled. Thus the second coupling arms 7a to 7c extend in a direction distant 120° from each other. The resonant frequency of the second coupling arms 7a to 7c is adjusted by the length and width of the second coupling arms 7a to 7c.

The second coupling arms 7a to 7c function, as described later, as a vibration absorber which reduces or filters a vibration from the outside. Here, preferably, the vibration frequency of the second coupling arms 7a to 7c is set different from the vibration frequency of the vibrating arms (the detection arms 2a to 2C and the drive arms 3a to 3c) and from the vibration frequency of the first coupling arms 5a to 5c.

The second fixed section 8 is constituted of a frame disposed in the area around the first fixed section 6, for example, constituted of an equilateral hexagon-shaped frame. Of the equilateral hexagon-shaped frame of the second fixed section 8, the second coupling arms 7a to 7c are coupled to the center of the three sides which don't adjoin each other. The second fixed section 8 is secured to the installation surface of the angular velocity sensor element 1 by use of adhesive agent or the like.

The angular velocity sensor element 1 is formed in an integrated manner and formed of silicon, for example. The angular velocity sensor element 1 can be formed all at once by physically or chemically etching and removing a portion other than the portion of a silicon substrate that is to be used as the element. The angular velocity sensor element 1 formed in this way meets the demand for thickness reduction.

Figure 2:
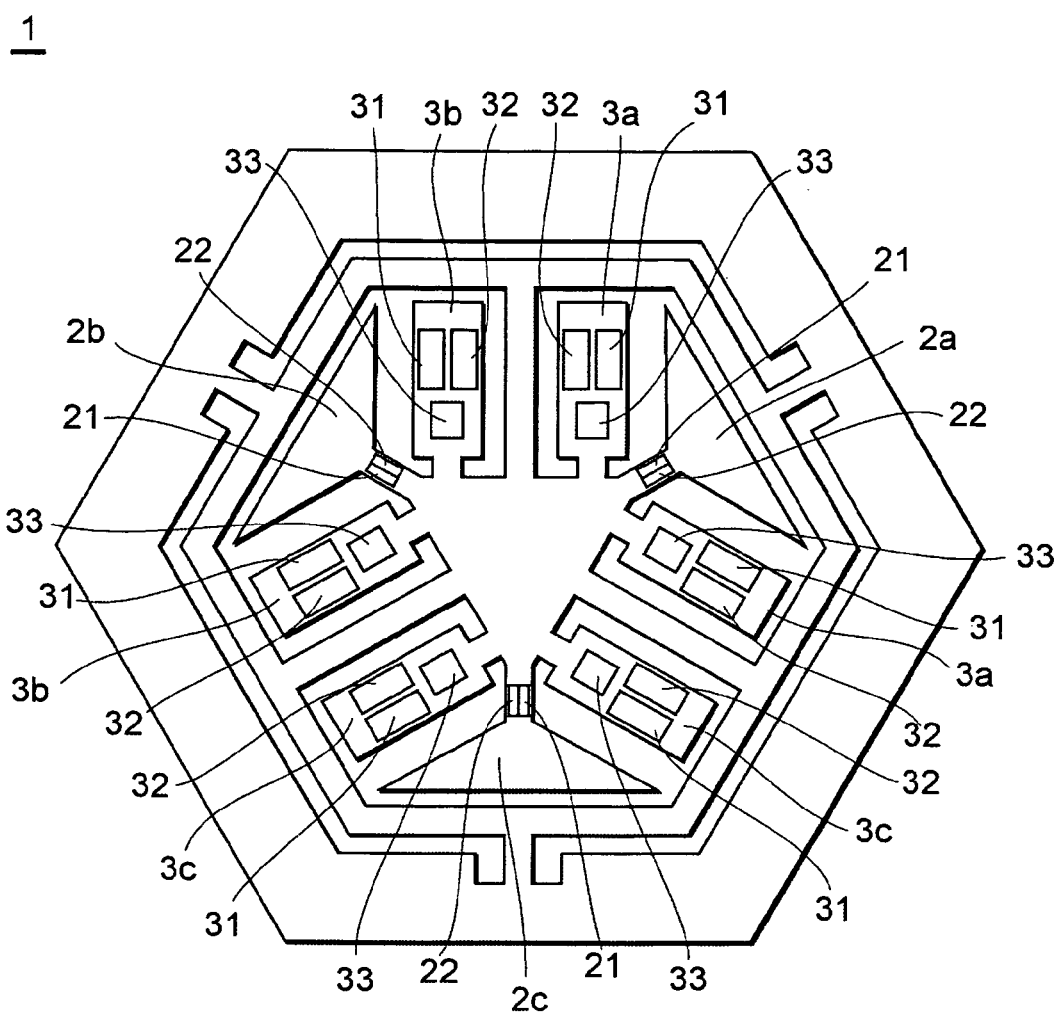
FIG. 2 is a plan view illustrating the arrangement of piezoelectric elements in the angular velocity sensor element 1.

In the angular velocity sensor element 1, a pair of piezoelectric elements are arranged on respective surfaces of the detection arms 2a to 2c and the drive arms 3a to 3c. FIG. 2 is a plan view for explaining the arrangement of the piezoelectric elements.

On the surface of the arm section (the portion other than the weight) of the detection arms 2a to 2c, as illustrated in FIG. 2, there are formed two piezoelectric elements 21 and 22. The two piezoelectric elements 21 and 22 are formed adjacent to each other in a width direction of the detection arms 2a to 2c. The piezoelectric elements 21 and 22 are disposed at a place where the detection arms 2a to 2c have a largest deformation. A signal dependent on deformation of the detection arms 2a to 2c is outputted from the piezoelectric elements 21 and 22.

On the surface of the drive arms 3a to 3c, there are formed three piezoelectric elements 31, 32 and 33. The two piezoelectric elements 31 and 32 are formed adjacent to each other in a width direction of the drive arms 3a to 3c, and drive the drive arms 3a to 3c along a plane parallel to the plane containing the angular velocity sensor element 1 to cause the drive arms 3a to 3c to vibrate. The other piezoelectric element 33 is formed at the center of the drive arms 3a to 3c and, when the drive arms 3a to 3c vibrate in a direction perpendicular to the plane containing the angular velocity sensor element 1, detects the vibration.

The piezoelectric elements 21, 22, 31, 32 and 33 are each composed of a layered product of lower electrode, piezoelectric substance film and upper electrode. The lower electrode and upper electrode are each composed of Pt film, for example. The piezoelectric substance is formed of piezoelectric zirconate titanate (PZT) and the like, for example.

Figure 3:
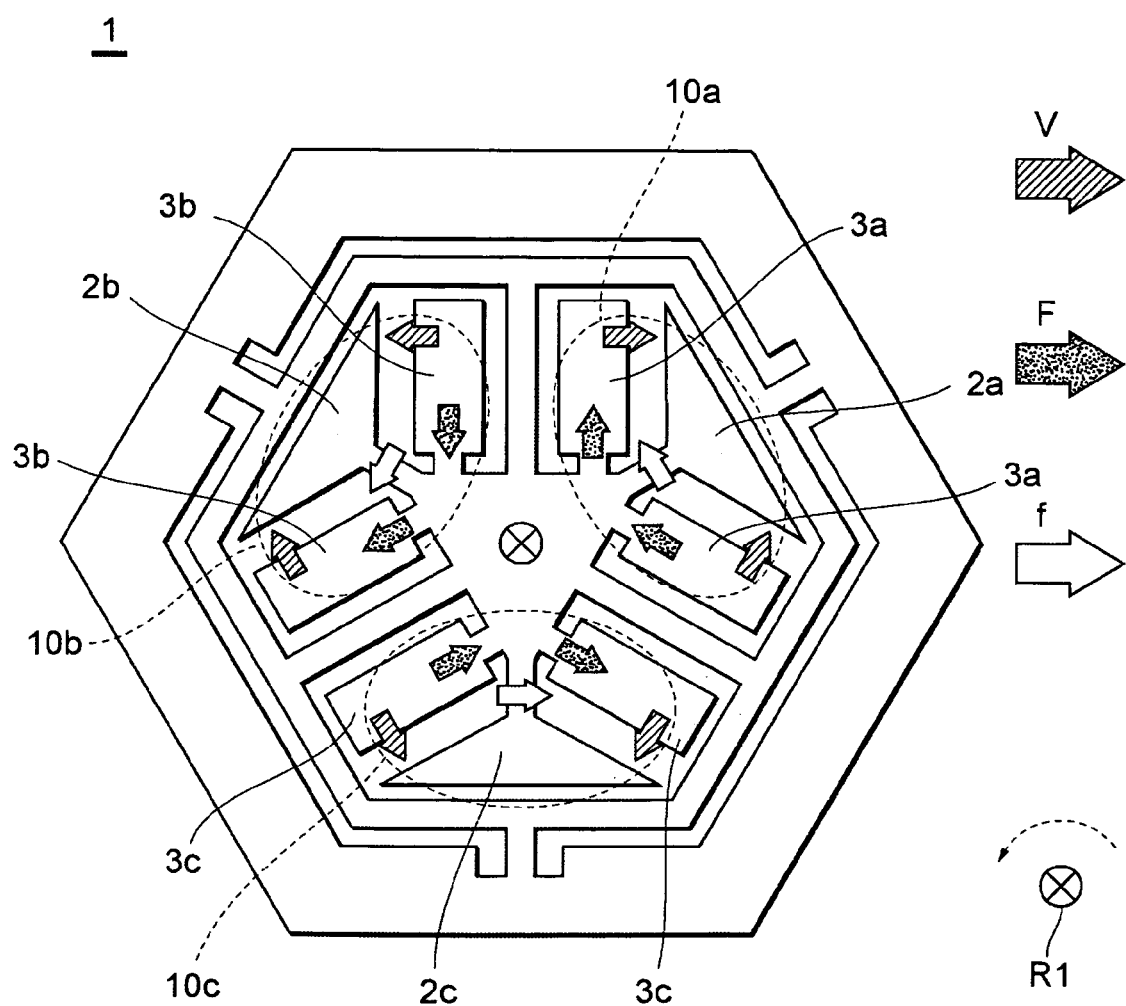
FIG. 3 is a view for explaining the operation of the angular velocity sensor element 1.

The operation of the angular velocity sensor element 1 will be described with reference to FIG. 3.

In the sensor units 10a to 10c, while the drive arms 3a to 3c make the drive vibration in a direction indicated by the arrow v, when a rotational angular velocity around the rotation axis R1 perpendicular to the plane of the angular velocity sensor element 1 is applied, Coriolis force F is exerted on the drive arms 3a to 3c in a direction perpendicular to the direction of the drive vibration and the rotation axis R1. The Coriolis force F is converted to rotation moment f, so that the detection arms 2a to 2c vibrate laterally or deform. Consequently, the rotation moment f exerted on the detection arms 2a to 2c is detected from output signals from the piezoelectric elements 21 and 22 arranged in the detection arms 2a to 2c, and thus a rotational angular velocity is determined.

The angular velocity sensor element 1 according to the present embodiment has an advantageous effect that, even when a sudden vibration is given from the outside, the vibration is absorbed to prevent the vibration from being transmitted to the element section. This will be described with reference to FIG. 4.

Figure 4:
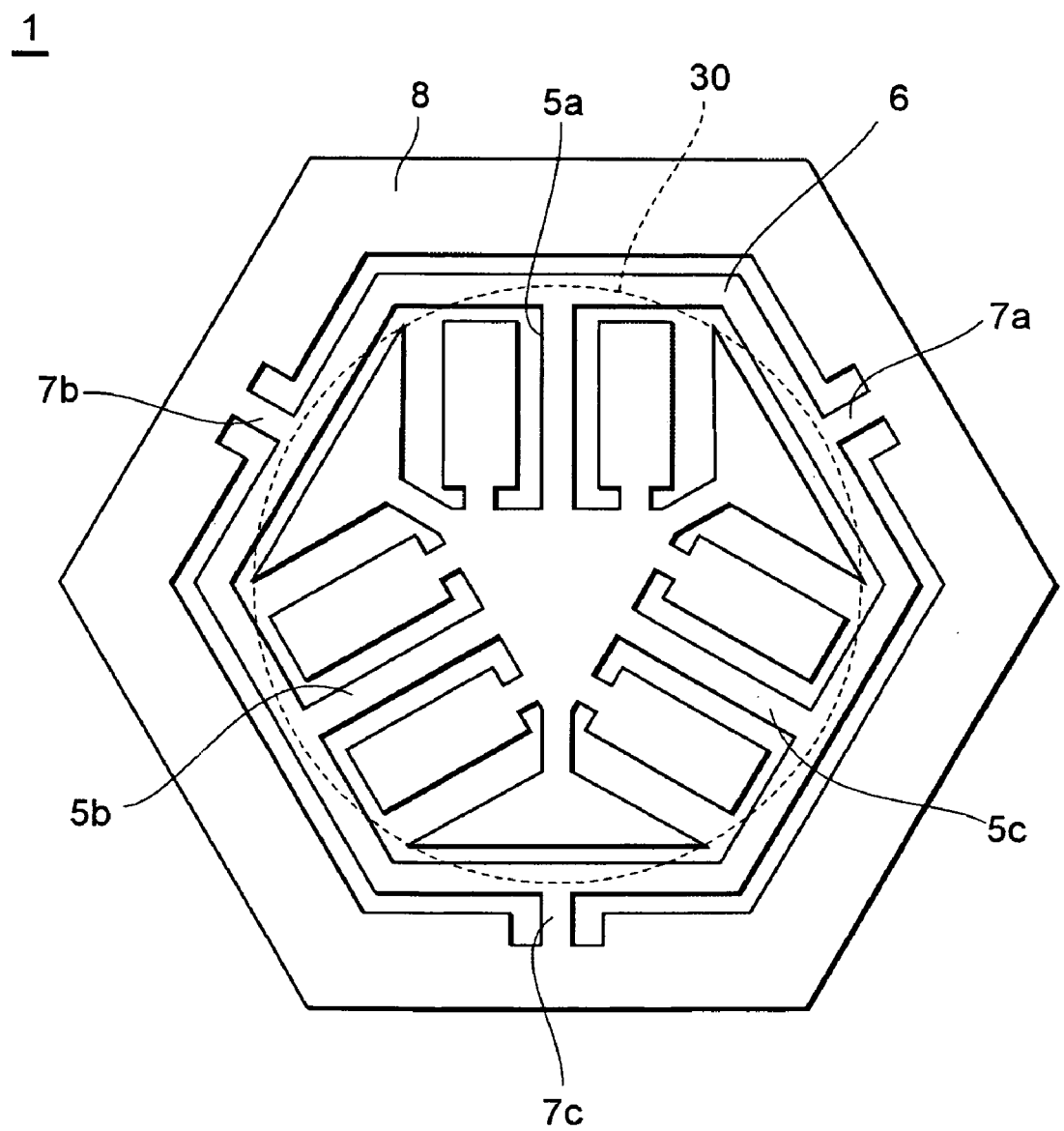
FIG. 4 is a view for explaining the operation of removing unwanted signals in the angular velocity sensor element 1.

The angular velocity sensor element 1 according to the present embodiment can be, as illustrated in FIG. 4, regarded as a structure in which a transducer 30 constituted of the first fixed section 6 and a structure in the inner side of the first fixed section 6 is coupled via the second coupling arms 7a to 7c to the second fixed section 8. Consequently, when a shock is given from the outside to the angular velocity sensor element 1, the vibration caused by this shock is reduced or filtered by the second coupling arms 7a to 7c. As a result, unwanted vibration of the transducer 30 is suppressed. Of the vibration given from the outside, a vibration component corresponding to the vibration frequency of the second coupling arms 7a to 7c may be transmitted via the vibration of the second coupling arms 7a to 7c to the transducer 30. However, when the vibration frequency of the second coupling arms 7a to 7c is different from that of the first coupling arms 5a to 5c, the vibration transmitted via the second coupling arms 7a to 7c is prevented from causing a vibration of the first coupling arms 5a to 5c, thus prevented the unwanted vibration from being transmitted to the element section and detected as noise.

According to the present embodiment, the element section constituted of the base section 4 and the three sensor units 10a to 10c is supported via the three first coupling arms 5a to 5c by the first fixed section 6; and the first fixed section 6 is supported via the three second coupling arms 7a to 7c by the second fixed section 8. In this way, the element section is supported by the first fixed section 6 at three points; and the first fixed section 6 is supported by the second fixed section 8 at three points. The one-point or two-point support is lower in stability (gravity center balancing) than the three-point support; and the four or more-point support is lower in external vibration removing effect than the three-point support. Thus, when the support stability and vibration removing effect are both considered, the three-point support is preferably used.

Figure 5:
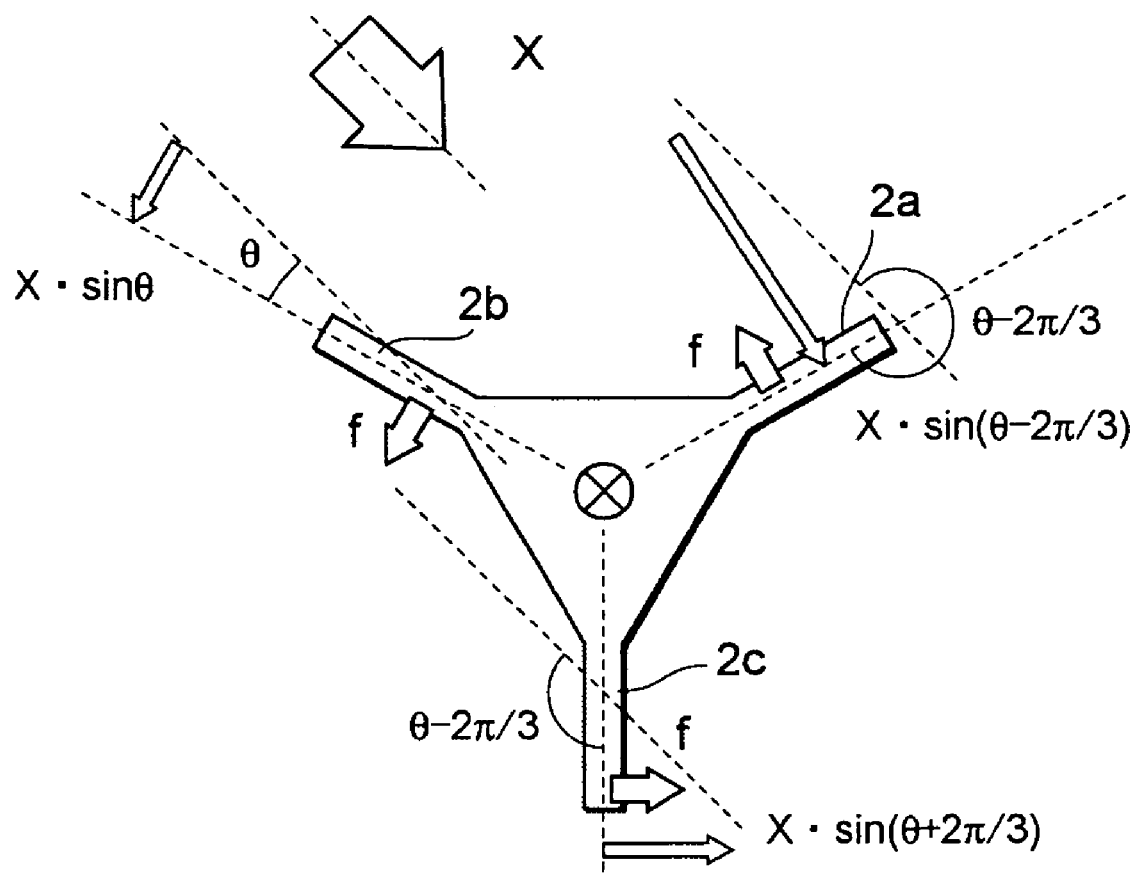
FIG. 5 is a view for explaining effects of translational acceleration in the operation of the angular velocity sensor element 1.

Further, the present embodiment has an advantage in that, since the three detection arms 2a to 2c are disposed distant 120° from each other, an error caused by translational acceleration is removed. This will be described with reference to FIG. 5. FIG. 5 illustrates only the main part of the angular velocity sensor element 1. When translational acceleration X is, as illustrated in FIG. 5, applied to the angular velocity sensor element 1, an acceleration component illustrated in FIG. 5 is exerted as noise on the three detection arms 2a to 2c along with rotation moment f. However, when all the outputs from the detection arms 2a to 2c are added, the translational acceleration components are, as expressed by the following formula, cancelled by each other, so only rotation moment f is detected. As a result, it is possible to implement the high-accuracy angular velocity sensor element 1.

$$F = 3 \times f + X \cdot \sin\theta + X \cdot \sin(\theta + 2\pi/3) + X \cdot \sin(\theta - 2\pi/3) \quad \text{[Formula 1]}$$
$$= 3 \times f + X \cdot \sin\theta + X \cdot \sin\theta \cdot \cos(2/3\pi) +$$
$$\quad X \cdot \cos\theta \cdot \sin(2/3\pi) + X \cdot \sin\theta \cdot \cos(-2/3\pi) +$$
$$\quad X \cdot \cos\theta \cdot \sin(-2/3\pi)$$
$$= 3 \times f + X \cdot \sin\theta + X \cdot \sin\theta \cdot (\cos(2/3\pi) + \cos(-2/3\pi)) +$$
$$\quad X \cdot \cos\theta \cdot (\sin(2/3\pi) + \sin(-2/3\pi))$$
$$= 3 \times f$$

Further, the angular velocity sensor element 1 according to the present embodiment has an advantage in that an angular velocity around three axes can be detected. This will be described with reference to FIG. 6. The detection of an angular velocity around an axis perpendicular to the element plane of the angular velocity sensor element 1 was described above. There will be described below the method of detecting an angular velocity around two axes parallel to the element plane of the angular velocity sensor element 1.

Figure 6:
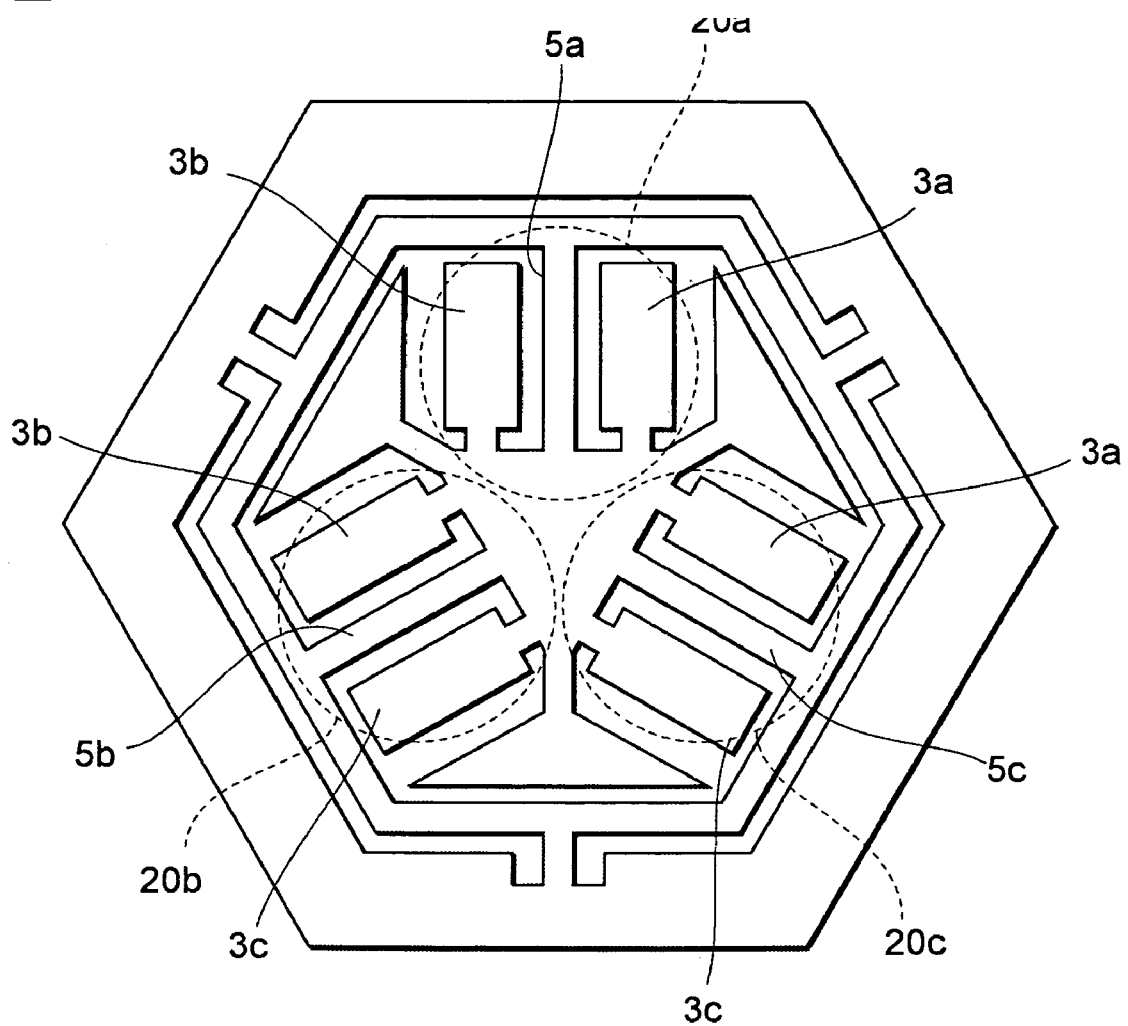
FIG. 6 is a view for explaining the operation of detecting an angular velocity around three axes.

As illustrated in FIG. 6, the angular velocity sensor element 1 according to the present embodiment includes, as a sensor unit for angular velocity around the two axes, a sensor unit 20a constituted of the drive arms 3a and 3b in the two sides of the first coupling arm Sa, and a sensor unit 20b constituted of the drive arms 3b and 3c in the two sides of the first coupling arm 5b, and a sensor unit 20c constituted of the drive arms 3c and 3a in the two sides of the first coupling arm 5c.

The two-axis detection method using the sensor units 20a to 20c is similar to a method using a tuning fork. More specifically, in the sensor units 20a to 20c, while the drive arms 3a to 3c make drive vibration in a lateral direction in the element plane, when a rotational angular velocity around a rotation axis parallel to the element plane is applied, Coriolis force is exerted on the drive arms 3a to 3c in a direction perpendicular to the element plane. The Coriolis force F causes a vibration of the drive arms 3a to 3c in a direction perpendicular to the element plane; and this vibration of the drive arms 3a to 3c in a direction perpendicular to the element plane is detected by the piezoelectric element 33, and thus a rotational angular velocity around the two axes parallel to the element plane is determined.

The angular velocity sensor element 1 according to the present embodiment has an advantageous effect that an acceleration in three-axis directions can be detected. This will be described with reference to FIGS. 7 and 8. FIG. 8 is a plan view of the second coupling arm 7a.

On the surface of the second coupling arms 7a to 7c, as illustrated in FIG. 8, there are formed two piezoelectric elements 71 and 72. The degree of bending of the second coupling arms 7a to 7c in the element plane is detected from a differential signal between the two piezoelectric elements 71 and 72; and the degree of bending of the second coupling arms 7a to 7c in a direction perpendicular to the element plane is detected from an in-phase signal between the two piezoelectric elements 71 and 72.

Figure 7:
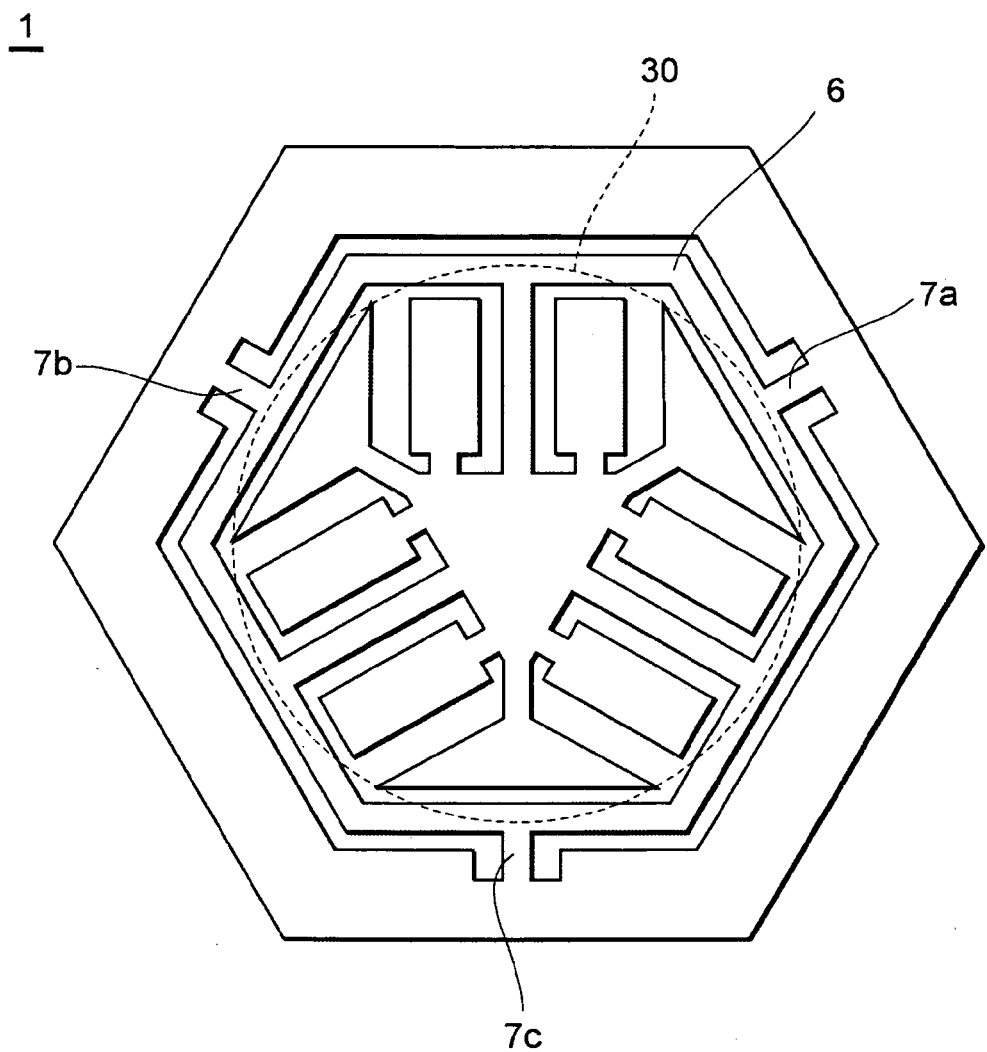
FIG. 7 is a view for explaining the operation of detecting an acceleration by the angular velocity sensor element 1.
Figure 8:
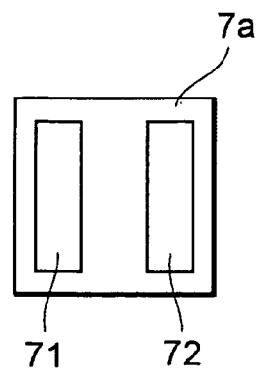
FIG. 8 is a plan view illustrating the arrangement of piezoelectric elements on a second coupling arm.

Here, as illustrated in FIG. 7, when an acceleration is applied to the transducer 30 constituted of the first fixed section 6 and the structure in the inner side of the first fixed section 6, the second coupling arms 7a to 7c bend in an up, down, left or right direction according to the acceleration direction. That is, when an acceleration in two-axis directions parallel to the element plane is applied, the second coupling arms 7a to 7c bend in the element plane. Thus, an acceleration in two-axis directions is determined based on a differential signal from the three pairs of piezoelectric elements 71 and 72. And when an acceleration in one-axis direction perpendicular to the element plane is applied, the second coupling arms 7a to 7c bend in a direction perpendicular to the element plane. Thus, an acceleration in one-axis direction is determined based on an in-phase signal from the three pairs of piezoelectric elements 71 and 72. In this way, an acceleration in three-axis directions can be detected based on a differential signal and in-phase signal from the three pairs of piezoelectric elements 71 and 72.

Figure 9:
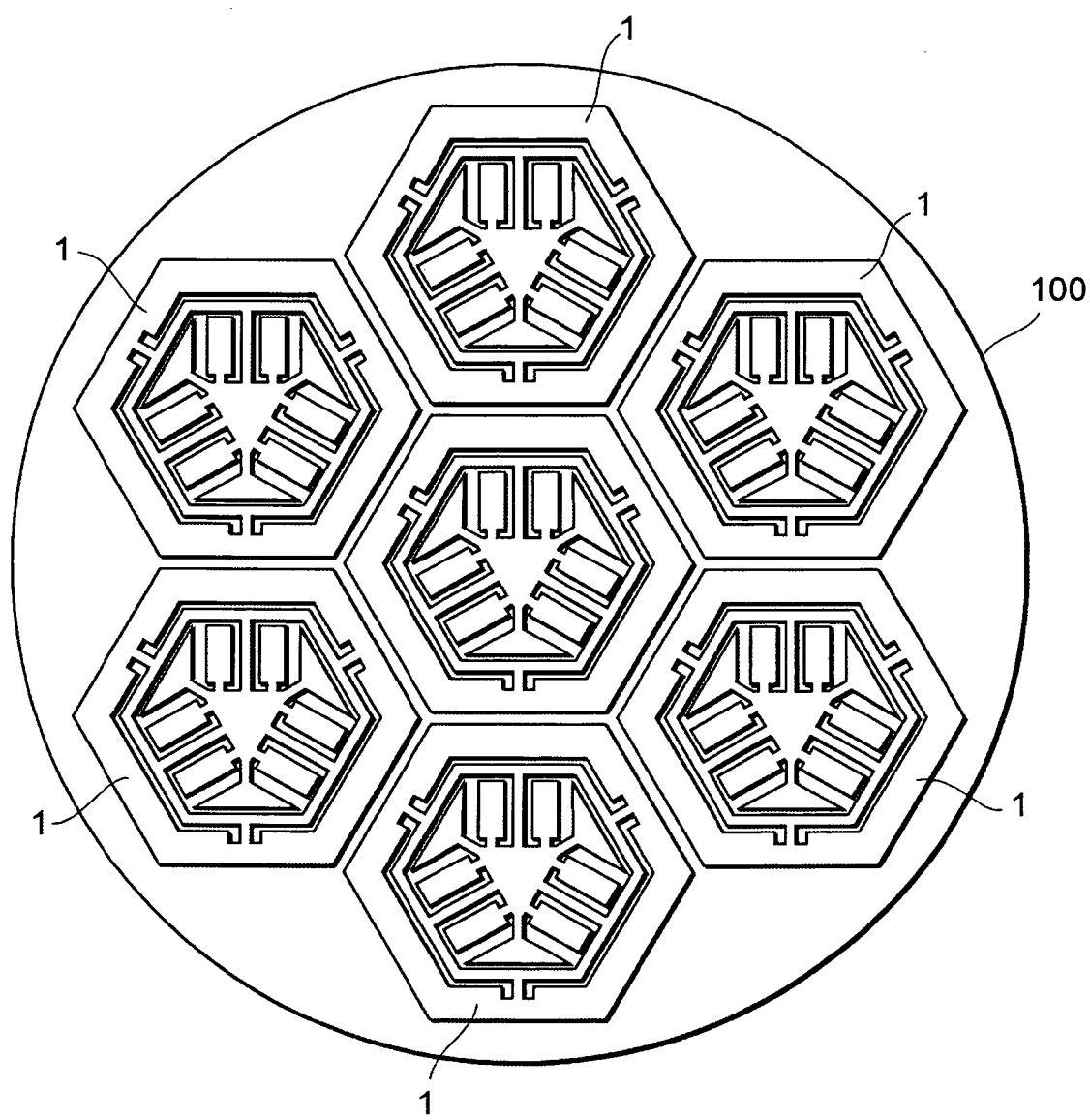
FIG. 9 is a view for explaining an advantageous effect of the angular velocity sensor element 1 in terms of manufacturing.

Further, the angular velocity sensor element 1 according to the present embodiment has an advantageous effect that, since many angular velocity sensor elements 1 can be, as illustrated in FIG. 9, formed using a single wafer 100, the efficient use of the wafer 100 is possible.

As described above, the present invention is not limited to the embodiments described above, and many modifications to the embodiments are possible without departing from the gist of the invention. For example, the number and arrangement of the sensor units 10a to 10c constituting the element section are not limited, and the arrangement and structure of the detection arms 2a to 2c and drive arms 3a to 3c constituting the sensor units 10a to 10c are also not limited. Further, the number of the first coupling arms 5a to 5c and the number of the second coupling arms 7a to 7c are not limited. Further, the second fixed section 8 may not be frame-shaped.

The inventive angular velocity sensor element can be installed in various apparatuses or devices which require angular velocity detection. For example, the angular velocity sensor element can be used for hand movement detection of a video camcorder, movement detection in a virtual reality apparatus, or direction detection in a car navigation system.

What is claimed is:

1. An angular velocity sensor element comprising:
    an element section with drive-related and detection-related vibrating arms;
    a first fixed section which is frame-shaped and which surrounds the element section;
    a first coupling arm which couples the element section to the first fixed section;
    a second fixed section which is disposed in at least a part of the area around the first fixed section; and
    a second coupling arm which couples the first fixed section to the second fixed section.

2. The angular velocity sensor element according to claim 1,
    wherein the position of coupling the first coupling arm to the first fixed section is different from the position of coupling the second coupling arm to the first fixed section.

3. The angular velocity sensor element according to claim 1,
    wherein the element section is secured via three said first coupling arms to the first fixed section, and the first fixed section is secured via three said second coupling arms to the second fixed section.

4. The angular velocity sensor element according to claim 1,
    wherein the element section includes:
    a base section coupled to the first coupling arm; and
    drive-related and detection-related vibrating arms which are disposed in a region defined by the base section, the first fixed section and the first coupling arm and which is coupled to the base section.

5. The angular velocity sensor element according to claim 4,
    wherein the vibrating arm includes:
    a detection arm coupled to the base section; and two drive arms, disposed in two sides of the detection arm, and coupled to the base section.

6. The angular velocity sensor element according to claim 1,
    wherein, on the second coupling arm, there is formed a piezoelectric element that detects deformation of the second coupling arm.

* * * * *